(12) United States Patent
Li et al.

(10) Patent No.: US 12,088,134 B2
(45) Date of Patent: Sep. 10, 2024

(54) BATTERY MANAGEMENT SYSTEM AND BATTERY PACK

(71) Applicant: Globe (Jiangsu) Co., Ltd., Changzhou (CN)

(72) Inventors: Baoan Li, Changzhou (CN); Xian Zhuang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 542 days.

(21) Appl. No.: 17/520,710

(22) Filed: Nov. 7, 2021

(65) Prior Publication Data
US 2022/0149643 A1 May 12, 2022

(30) Foreign Application Priority Data

Nov. 10, 2020 (CN) .......................... 202011244128.4
Nov. 10, 2020 (CN) .......................... 202022575422.5

(51) Int. Cl.
*H02J 7/00* (2006.01)

(52) U.S. Cl.
CPC .......... *H02J 7/0063* (2013.01); *H02J 7/0013* (2013.01); *H02J 7/00306* (2020.01); *H02J 7/0047* (2013.01)

(58) Field of Classification Search
CPC .................................................. H02J 7/0063
USPC ........................................................ 320/135
See application file for complete search history.

(56) References Cited

U.S. PATENT DOCUMENTS

| 5,493,197 | A  | * | 2/1996  | Eguchi ............... | H02J 7/0031 320/134 |
| 2007/0247107 | A1 | * | 10/2007 | Wang .................. | H02J 7/0071 320/107 |
| 2009/0295332 | A1 | * | 12/2009 | Yang .................. | H02J 7/00306 320/132 |
| 2010/0173180 | A1 | * | 7/2010  | Li ...................... | B60L 58/18 429/61 |
| 2011/0043043 | A1 | * | 2/2011  | Anupindi ............ | H02J 7/0069 307/66 |
| 2011/0296218 | A1 | * | 12/2011 | Kim ................... | H02J 3/381 713/323 |
| 2012/0032643 | A1 | * | 2/2012  | Yun .................... | H02J 7/0031 429/7 |

(Continued)

FOREIGN PATENT DOCUMENTS

| CN | 110239372 | A | * | 9/2019 | ............... B60L 3/00 |
| CN | 215474598 | U | * | 1/2022 | |

(Continued)

*Primary Examiner* — Jerry D Robbins

(57) ABSTRACT

The disclosure provides a battery management system and a battery pack. The battery management system includes at least two analog front-end chips and a control unit. The analog front-end chip is configured to acquire an output voltage, an output current, or a working temperature of a battery. And the control unit controls the analog front-end chip to be powered on and down. When any analog front-end chip is awakened by an external interference signal, the analog front-end chip directly or indirectly supplies power to the control unit to enable the control unit to work, and then the control unit sends a power-down signal to the analog front-end chip to power the analog front-end chip down.

13 Claims, 3 Drawing Sheets

(56) References Cited

U.S. PATENT DOCUMENTS

| | | | | |
|---|---|---|---|---|
| 2013/0069429 A1* | 3/2013 | Yang | ........................ | H04Q 9/00 307/23 |
| 2013/0106355 A1* | 5/2013 | Kim | ..................... | H02J 7/0025 320/118 |
| 2014/0103876 A1* | 4/2014 | Kim | ..................... | H02J 7/0024 320/112 |
| 2018/0301913 A1* | 10/2018 | Irish | .................... | H02J 7/00047 |
| 2020/0144679 A1* | 5/2020 | Kam | ................ | H01M 10/4207 |
| 2021/0111567 A1* | 4/2021 | Wang | ................... | H02J 7/0013 |
| 2021/0203170 A1* | 7/2021 | Luo | ....................... | H02J 7/0019 |
| 2022/0231349 A1* | 7/2022 | Kim | ................... | H02J 7/00306 |

FOREIGN PATENT DOCUMENTS

| | | | |
|---|---|---|---|
| CN | 217639276 U | * | 10/2022 |
| CN | 219843450 U | * | 10/2023 |

\* cited by examiner

BATTERY MANAGEMENT SYSTEM AND BATTERY PACK

CROSS REFERENCE TO RELATED APPLICATION

The present application is based on, and claims the priority from, Chinese application number CN202011244128.4, filed on Nov. 10, 2020, and Chinese application number CN202022575422.5, filed on Nov. 10, 2020, the disclosure of which is hereby incorporated by reference herein in its entirety.

TECHNICAL FIELD

The disclosure relates to a battery management system and a battery pack having the battery management system.

BACKGROUND

With the advancement of society, portable power tools have become increasingly widespread in our life, and battery technology which is the power source of the power tool, is developed constantly as well. As the aspect of environmental protection and repeatability usage, the demand for secondary batteries is increasing. And the lithium battery becomes the ideal battery of the power tool as the unique advantages such as high energy density, long service life, high discharge voltage, no memory effect, and the like. In order to meet the requirements of portable power tools for voltage and capacity, a lithium battery pack may be used to supply power.

To prolong the service life and improve the reliability of the lithium battery pack, and the battery management system (BMS) is used to manage the battery. The battery management system typically uses an analog front-end chip (AFE) to sample the battery to obtain information of the battery, such as the output voltage, the output current, the operating temperature, and the like. When strings of battery cell are quite more, a plurality of analog front-end chips are typically cascaded, thereby the sampling of the plurality of strings of battery cell is completed. The analog front-end chip is powered on by hardware signal of the TS pin, and is powered down by the power-down instruction sent by the micro-control unit (MCU) through the I2C chip. When the battery is in an environment with serious interference, the high-serial analog front-end chip may be awakened abnormally, at this time, the control unit is in a non-working state. Such that the analog front-end chip cannot be powered down, the high-serial battery cells can be over discharged, and even the whole battery pack would be scrapped.

It is necessary to provide a new battery management system to solve the problems mentioned above.

SUMMARY

The disclosure provides a battery management system that is capable of sending a power-down signal to an analog front-end chip awakened by an external interference signal in time. Such that the analog front-end chip awakened by an external interference signal can be powered down normally to avoid over-discharge of the battery cell.

The disclosure provides a battery management system which includes at least two analog front-end chips and a control unit. The analog front-end chip is configured to acquire an output voltage, an output current, or a working temperature of a battery. And the control unit controls the analog front-end chip to power up and down. The analog front-end chip directly or indirectly supplies power to the control unit to work when any one of the analog front-end chips is awakened by an external interference signal, then the control unit sends a power-down signal to the analog front-end chip to power the analog front-end chip down.

As a further improvement of the disclosure, the at least two analog front-end chips includes a primary analog front-end chip and at least one advanced analog front-end chip. The advanced analog front-end chip directly or indirectly sends a wake-up signal to the primary analog front-end chip to wake up the primary analog front-end chip when the advanced analog front-end chip is awakened by an external interference signal, and then the primary analog front-end chip supplies power to the control unit to enable the control unit to operate. Then, the control unit sends a power-down signal to the primary analog front-end chip and the advanced analog front-end chip to power the primary analog front-end chip and the advanced analog front-end chip down.

As a further improvement of the disclosure, the control unit has a communication pin, and the analog front-end chip has a TS pin connected with the communication pin. And the control unit sends a wake-up signal to the TS pin through the communication pin to wake up the analog front-end chip.

As a further improvement of the disclosure, the battery management system includes a coupled wake-up circuit. The analog front-end chip has a 3V3 pin and a TS pin, and the control unit has a VCC pin. The 3V3 pin of the primary analog front-end chip is connected to the VCC pin of the control unit, and the 3V3 pin of the advanced analog front-end chip is connected to the TS pin of the primary analog front-end chip through the coupled wake-up circuit.

As a further improvement of the disclosure, the analog front-end chip further includes a GND pin. The coupled wake-up circuit includes a first resistor, a second resistor, a first capacitor, and a second capacitor. Two ends of the first resistor are separately connected to the 3V3 pin and the GND pin of the advanced analog front-end chip. Two ends of the second resistor are separately connected to the TS pin and the GND pin of the primary analog front-end chip. Two ends of the first capacitor are separately connected to the TS pin of the primary analog front-end chip and the 3V3 pin of the advanced analog front-end chip. And two ends of the second capacitor are separately connected to the GND pin of the primary analog front-end chip and the GND pin of the advanced analog front-end chip.

As a further improvement of the disclosure, the battery management system further includes an LDO chip for supplying power to the control unit. When any one of the analog front-end chips is awakened by an external interference signal, the analog front-end chip sends a wake-up signal to the LDO chip to enable the LDO chip to supply power to the control unit to enable the control unit to work. Then, the control unit sends a power-down signal to the analog front-end chip to power the analog front-end chip down.

As a further improvement of the disclosure, the control unit has a communication pin and an EN pin, and the LDO chip has an EN pin. The communication pin is connected to the EN pin of the LDO chip, and an EN pin of the control unit is connected to the TS pin of the analog front-end chip.

As a further improvement of the disclosure, a 3V3 pin of the analog front-end chip is connected to the EN pin of the LDO chip through the coupled wake-up circuit.

As a further improvement of the disclosure, the coupled wake-up circuit includes a third resistor, a fourth resistor, a third capacitor, and a fourth capacitor. Two ends of the third resistor are separately connected to the 3V3 pin and a GND pin of one analog front-end chip, and two ends of the fourth resistor are separately connected to the EN pin of the LDO chip and the GND pin of the other analog front-end chip. One end of the third capacitor is connected to one end of the third resistor close to the 3V3 pin, and the other end of the third capacitor is connected to the EN pin of the LDO chip. One end of the fourth capacitor is connected to one end of the third resistor close to the GND pin, and the other end of the fourth capacitor is connected to the GND pin of the LDO chip. And the 3V3 pins of the remaining analog front end chips are connected to the EN pin of the LDO chip.

As a further improvement of the disclosure, diodes are provided between the 3V3 pins of the remaining analog front-end chips and the EN pin of the LDO chip, such that current can only flow into the EN pin of the LDO chip.

As a further improvement of the present disclosure, before the control unit sends a power-down signal, the control unit detects whether there is a peripheral connected with the battery. If not, the control unit sends a power-down signal to the analog front-end chip to power the analog front-end chip down.

As a further improvement of the disclosure, if a peripheral is connected to the battery, the control unit waits for a preset time and then sends a power-down signal to the analog front-end chip.

The disclosure also provides a battery pack, the battery pack includes a number of batteries, a battery management system for controlling the number of batteries, and a control unit for controlling the analog front-end chip to be powered on or down. The battery management system includes at least two analog front-end chips for acquiring an output voltage, an output current, or a working temperature of a battery. The analog front-end chip directly or indirectly supplies power to the control unit to enable the control unit to work when any one of the analog front-end chips is awakened by an external interference signal, then the control unit sends a power-down signal to the analog front-end chip to power down the analog front-end chip.

The disclosure has the beneficial effects that: the battery management system can send a power-down signal to the analog front-end chip awakened by the external interference signal in time. Such that the analog front-end chip awakened by an external interference signal can be powered down normally to avoid over-discharge of the battery cell.

DETAILED DESCRIPTION

To make the objects, technical solutions and advantages of the disclosure clearer, drawings and specific embodiments will be combined to describe the disclosure in detail.

A battery management system includes at least two analog front end chips (AFEs) and a control unit. The analog front-end chip is configured to acquire an output voltage, an output current, or a working temperature of the battery. The battery may be a single battery cell or a battery string formed by a plurality of battery cells in series or in parallel. The control unit is configured to control the analog front-end chip to power on or down. When any one of the analog front-end chips is awakened by an external interference signal, the analog front-end chip supplies power directly or indirectly to the control unit to enable the control unit to work. Then, the control unit detects whether there is a peripheral connected with the battery. If not, the control unit sends a power-down signal to the analog front-end chip to power the analog front-end chip down to avoid over-discharge of the battery. If a peripheral is connected to the battery, the control unit waits for a preset time and then sends a power-down signal to the analog front-end chip. The disclosure will be illustrated combined with specific embodiments below.

Figure 1:
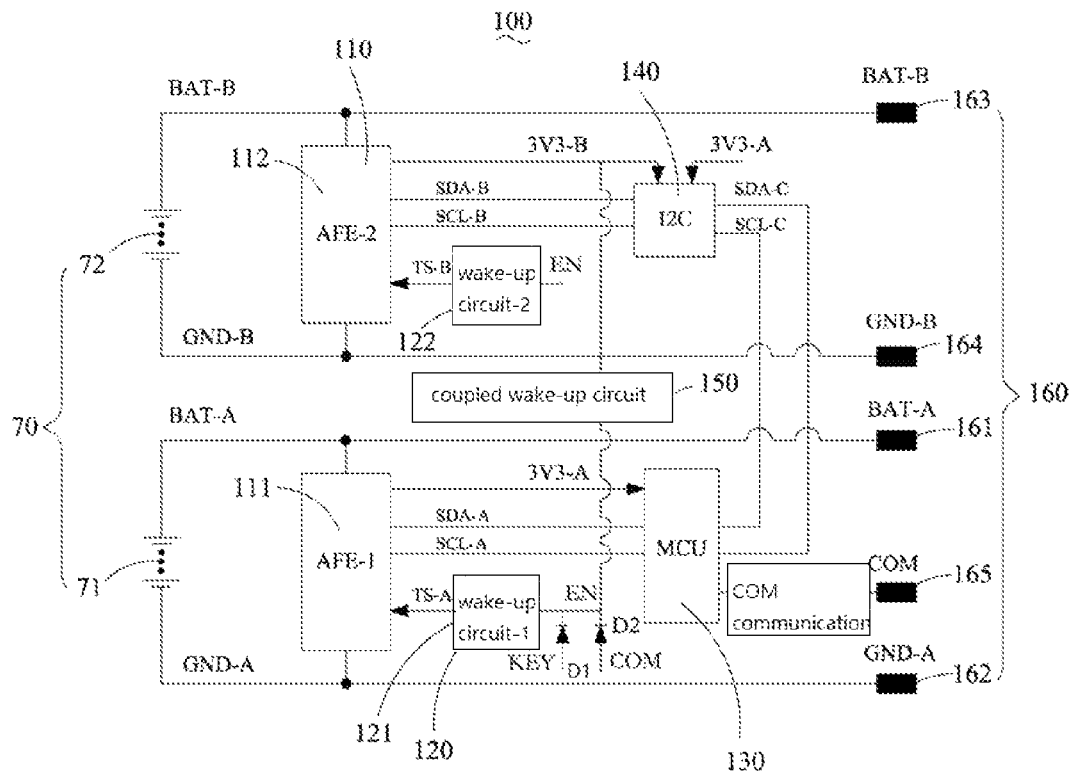
FIG. 1 is a block diagram of a battery management system in a first embodiment of the disclosure.
Figure 2:
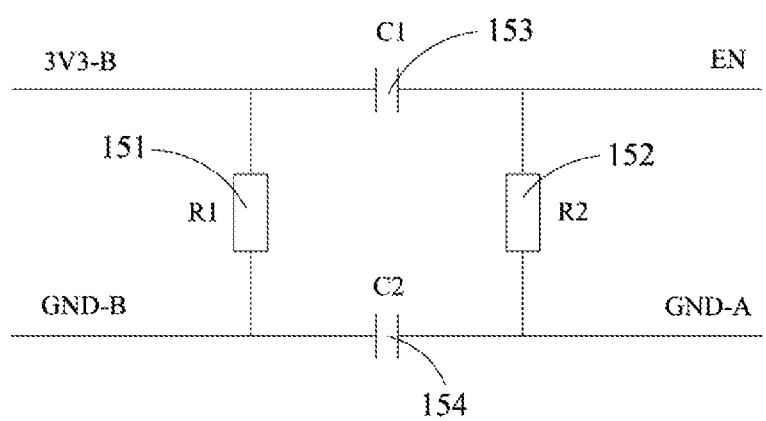
FIG. 2 is a structural diagram of a coupled wake-up circuit in the first embodiment.

Referring to FIG. 1 and FIG. 2, a battery management system 100 is provided for monitoring an output voltage, an output current, or a working temperature of a battery 70. The battery 70 includes a first battery 71 and a second battery 72. The battery management system 100 includes an analog front-end chip 110, a wake-up circuit 120 for waking up the analog front-end chip 110, a control unit 130, an I2C unit 140, a coupled wake-up circuit 150 and an output assembly 160. Referring to FIG. 1, the analog front-end chip 110 is used for detecting the output voltage, the output current, or the working temperature of the battery 70. Each analog front end chip 110 includes a TS pin, an SDA pin, an SCL pin, and a 3V3 pin. The analog front-end chip 110 includes a primary analog front-end chip 111 and at least one advanced analog front-end chip 112. The primary analog front-end chip 111 is used for detecting the first battery 71, and the advanced analog front-end chip 112 is used for detecting the second battery 72. In the present embodiment, the number of the advanced analog front-end chips 112 is 1, but in other embodiments, the number of the advanced analog front-end chips 112 can be set according to the number of the batteries 70. The wake-up circuit 120 includes a primary wake-up circuit 121 cooperated with the primary analog front-end chip 111 and an advanced wake-up circuit 122 cooperated with the advanced analog front-end chip 112. The primary wake-up circuit 121 and the advanced wake-up circuit 122 each have a signal output pin and an EN pin. The signal output pin of the primary wake-up circuit 121 is connected to the TS pin of the primary analog front-end chip 111, and the EN pin of the primary wake-up circuit 121 is connected to the 3V3 pin of the advanced analog front-end chip 112 through the coupled wake-up circuit 150. The signal output pin of the advanced wake-up circuit 122 is connected to the TS pin of the advanced analog front-end chip 112, and the EN pin of the advanced wake-up circuit 122 is connected to the EN pin of the primary wake-up circuit 121. In the present embodiment, the control unit 130 is a micro-control unit (MCU). The control unit 130 is connected to the SDA pin and the SCL pin of the primary analog front-end chip 111 to communicate with the primary analog front-end chip 111. The control unit 130 is also connected to the SDA pin and the SCL pin of the advanced analog front-end chip 112 through the I2C unit 140 to communicate with the advanced analog front-end chip 112. The 3V3 pin of the primary analog front-end chip 111 is connected to the VCC pin of the control unit 130 to supply power to the control unit 130. One end of the coupled wake-up circuit 150 is connected to the EN pin of the primary wake-up circuit 121, and the other end is connected to the 3V3 pin of the advanced analog front-end chip 112. Referring to FIG. 2, the coupled wake-up circuit 150 includes a first resistor 151, a second resistor 152, a first capacitor 153, and a second capacitor 154. Two ends of the first resistor 151 are separately connected to the 3V3 pin and the GND pin of the advanced analog front-end chip 112, and two ends of the second resistor 152 are separately connected to the TS pin and the GND pin of the primary analog front-end chip 111. In this embodiment, one end of the second resistor 152 is connected to the EN pin of the primary wake-up circuit 121 to be connected to the TS pin of the primary analog front-end chip 111 through the primary wake-up circuit 121. Two ends of the first capacitor 153 are separately connected to the TS pin of the primary analog front-end chip 111 and the 3-V3 pin of the advanced analog front-end chip 112. And two ends of the second capacitor 154 are separately connected to the GND pin of the primary analog front-end chip 111 and the GND pin of the advanced analog front-end chip 112. Referring to FIG. 1, the output assembly 160 includes a first positive terminal 161, a first negative terminal 162, a second positive terminal 163, a second negative terminal 164, and a communication terminal 165. The first positive terminal 161 and the first negative terminal 162 are connected to two ends of the first battery 71, respectively. The second positive terminal 163 and the second negative terminal 164 are connected to two ends of the second battery 72, respectively. Such that electric energy of the first battery 71 and the second battery 72 can be output by the first positive terminal 161, the first negative terminal 162, the second positive terminal 163, and the second negative terminal 164. The communication terminal 165 is connected to a COM communication pin of the control unit 130. Preferably, the EN pin of the primary wake-up circuit 121 is connected to a KEY terminal through a first diode D1 and is connected to the COM communication pin of the control unit 130 through a second diode D2. Thus, the control unit 130 can directly wake up the primary analog front-end chip 111 and the advanced analog front-end chip 112 through the COM communication pin, or the user can directly wake up the primary analog front-end chip 111 and the advanced analog front-end chip 112 through the KEY.

As shown in FIG. 1, after the control unit 130 does not work and the primary analog front-end chip 111 is awakened by an external interference signal, the 3V3 pin of the primary analog front-end chip 111 supplies power to the control unit 130 to enable the control unit 130 to work normally. Then, the control unit 130 detects whether there is a peripheral connected to the input assembly 160, and if not, the control unit 130 sends a power-down signal to the primary analog front-end chip 111 to power the primary analog front-end chip 111 down, and then the control unit 130 is powered down. In the case, the primary analog front-end chip 111 directly supplies power to the control unit 130. If a peripheral is connected to the input assembly 60, the control unit 130 waits for a preset time and then sends a power-down signal to the primary analog front-end chip 111. The preset time can be set by the user.

After the control unit 130 does not work and the advanced analog front-end chip 112 is awakened by an external interference signal, the 3V3 pin of the advanced analog front-end chip 112 sends a wake-up signal to the TS pin of the primary analog front-end chip 111 through the coupled wake-up circuit 150 to wake up the primary analog front-end chip 111. Then, the 3V3 pin of the primary analog front-end chip 111 supplies power to enable the control unit 130 to work normally. At this time, the control unit 130 detects whether there is a peripheral connected to the input assembly 160, if not, the control unit 130 directly sends a power-down signal to the primary analog front-end chip 111, and sends a power-down signal to the advanced analog front-end chip 112 through the I2C unit 140, and then the control unit 130 is powered down. In the case, the advanced analog front-end chip 112 indirectly supplies power to the control unit 130. If a peripheral is connected to the input assembly 160, the control unit 130 waits for a preset time and then sends a power-down signal to the primary analog front-end chip 111 and the advanced analog front-end chip 112. In the present embodiment, the advanced analog front-end chip 112 may send a wake-up signal directly to the primary analog front-end chip 111, however, in other embodiments, the advanced analog front-end chip 112 may also indirectly send a wake-up signal to the primary analog front-end chip 111. For example, the advanced analog front-end chip 112 sends a wake-up signal to a third analog front-end chip, and then sends the wake-up signal to the primary analog front-end chip 111 through the third analog front-end chip to indirectly wake up the primary analog front-end chip 111.

Figure 3:
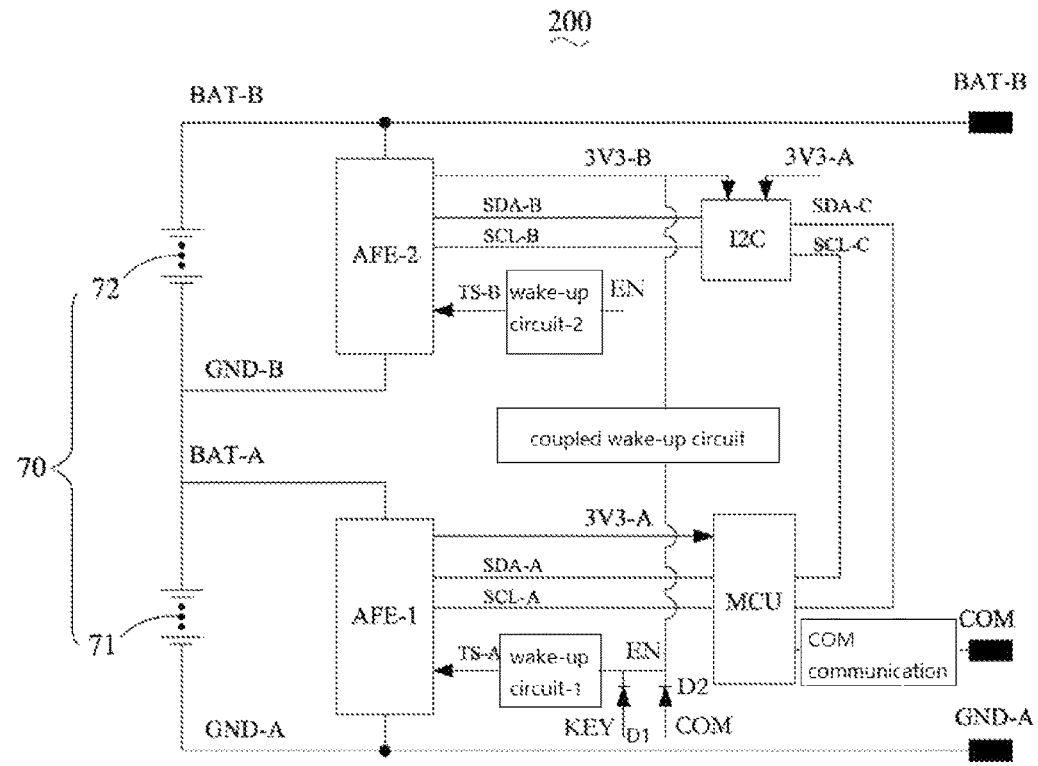
FIG. 3 is a block diagram of a battery management system in a second embodiment of the disclosure.

In the present embodiment, two ends of the first battery 71 are separately connected to the first positive terminal 161 and the first negative terminal 162, and two ends of the second battery 72 are separately connected to the second positive terminal 163 and the second negative terminal 164. Such that user can cooperate with the output assembly 160 through different docking terminal groups to enable the battery 70 to output a series voltage or a parallel voltage. However, in other embodiments, the battery 70 may also be arranged to output a series voltage directly. A battery management system 200 of a second embodiment is shown in FIG. 3. The structure of the battery management system 200 is substantially the same with the structure of the battery management system 100, except that the positive electrode of the first battery 71 is directly connected to the negative electrode of the second battery 72 to enable the battery 70 to output a series voltage.

Compared with the present technology, the battery management system 100 of the disclosure can send a power-down signal to the analog front-end chip 110 awakened by an external interference signal in time. Such that the analog front-end chip 110 awakened by the external interference signal can be powered down normally to avoid over-discharge of the battery cell.

Figure 4:
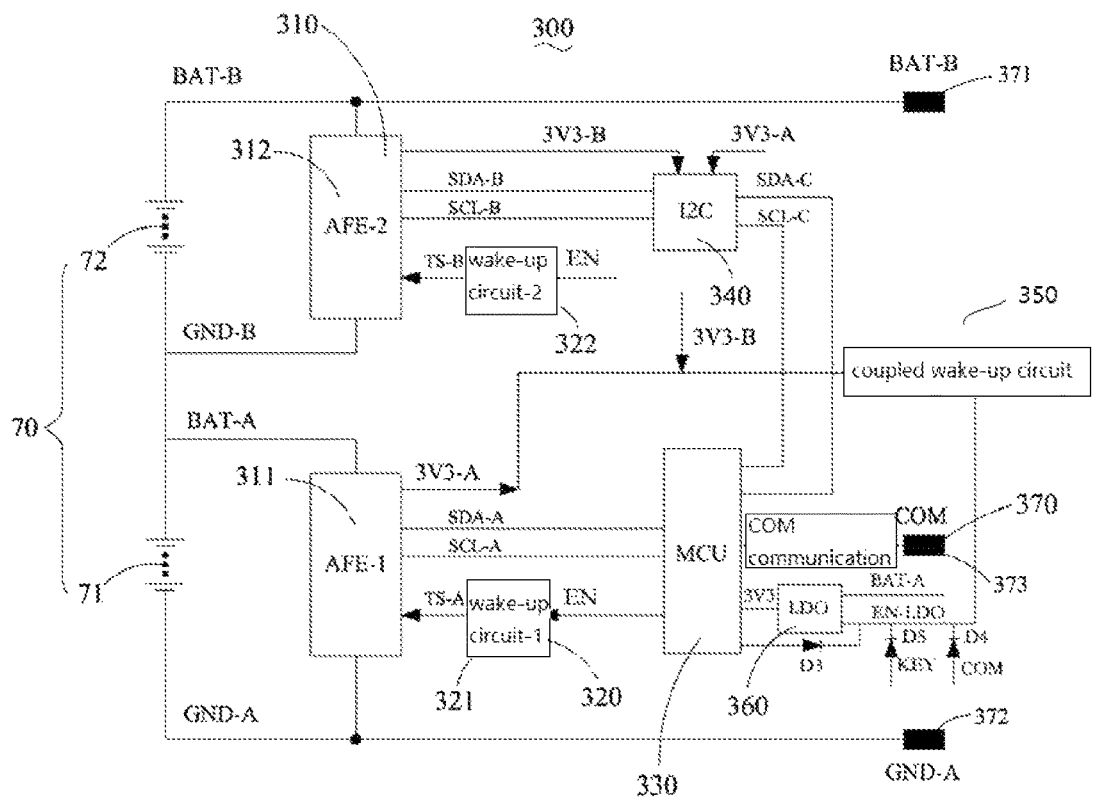
FIG. 4 is a block diagram of a battery management system in a third embodiment of the disclosure.

FIG. 4 shows a battery management system 300 of a third embodiment of the disclosure. The battery management system 300 includes an analog front-end chip 310, a wake-up circuit 320 for waking up the analog front-end chip 310, a control unit 330, an I2C unit 340, a coupled wake-up circuit 350, an LDO chip 360 supplying power to the control unit 330, and an output assembly 370. Referring to FIG. 4, the analog front-end chip 310 is used for detecting an output voltage, an output current, or an working temperature of the battery 70. Each analog front end chip 310 includes a TS pin, an SDA pin, an SCL pin, and a 3 V 3 pin. The analog front end chip 310 includes a first analog front end chip 311 and a second analog front end chip 312. The first analog front-end chip 311 is used for detecting the first battery 71, and the second analog front-end chip 312 is used for detecting the second battery 72. In the embodiment, the number of the analog front-end chips 310 is two, but in other embodiments, the number of the analog front-end chips 310 can be set according to the number of the batteries 70. The wake-up circuit 320 includes a first wake-up circuit 321 cooperated with the first analog front-end chip 311 and a second wake-up circuit 322 cooperated with the second analog front-end chip 312. The first wake-up circuit 321 and the second wake-up circuit 322 each have a signal output pin and an EN pin. The signal output pin of the first wake-up circuit 321 is connected to the TS pin of the first analog front-end chip 311, and the signal output pin of the second wake-up circuit 322 is connected to the TS pin of the second analog front-end chip 312. The EN pins of the first wake-up circuit 321 and the second wake-up circuit 322 are commonly connected to the EN pin of the control unit 330, such that the control unit 330 can wake up the first analog front-end chip 311 and the second analog front-end chip 312. In the present embodiment, the control unit 330 is a microcontrol unit (MCU). The control unit 330 is connected to the SDA pin and the SCL pin of the first analog front-end chip 311 to communicate with the first analog front-end chip 311. The control unit 330 is also connected to the SDA pin and the SCL pin of the second analog front-end chip 312 through the I2C unit 340 to communicate with the second analog front-end chip 312. The coupled wake-up circuit 350 includes a signal input terminal and a signal output terminal. The 3V3 pins of the first analog front-end chip 311 and the second analog front-end chip 312 are connected to the signal input end of the coupled wake-up circuit 350, and the signal output end of the coupled wake-up circuit 350 is connected to the LDO chip 360. The LDO chip 360 is used for supplying power to the control unit 330. The LDO chip 360 includes a BAT pin, an EN pin, and a 3V3 pin. The BAT pin of the LDO chip 360 is connected to a power supply, the EN pin is connected to the signal output terminal of the coupled wake-up circuit 350, and the 3V3 pin is connected to the VCC pin of the control unit 330. The output assembly 370 includes a positive terminal 371, a negative terminal 372, and a communication terminal 373. The positive terminal 371 is connected to the positive electrode of the second battery 72, the negative electrode of the second battery 72 is connected to the positive electrode of the first battery 71, the negative electrode of the first battery 71 is connected to the negative terminal 372, and the communication terminal 373 is connected to a COM communication pin of the control unit 330.

Figure 5:
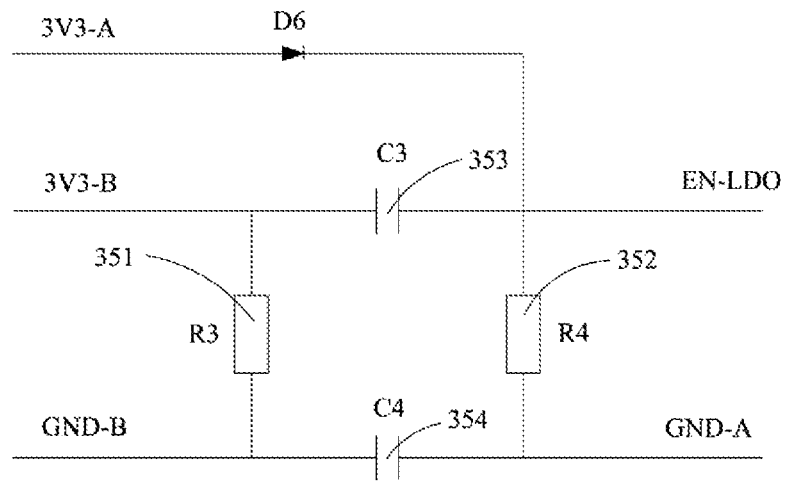
FIG. 5 is a structural diagram of a coupled wake-up circuit in the third embodiment.

Referring to FIG. 5, the coupled wake-up circuit 350 includes a third resistor 351, a fourth resistor 352, a third capacitor 353, and a fourth capacitor 354. Two ends of the third resistor 351 are separately connected to the 3V3 pin and the GND pin of the second analog front-end chip 312. One end of the fourth resistor 352 is connected to the GND pin of the first analog front-end chip 311, and the other end of the fourth resistor 352 is connected to the EN pin of the LDO chip 360. Two ends of the third capacitor 353 are separately connected to the 3V3 pin of the second analog front-end chip 312 and the EN pin of the LDO chip 360. Two ends of the fourth capacitor 354 are separately connected to the GND pin of the first analog front-end chip 311 and the GND pin of the second analog front-end chip 312. The 3V3 pin of the first analog front-end chip 311 is connected to the EN pin of the LDO chip 360. Preferably, the first analog front-end chip 311 is connected to the EN pin of the LDO chip 360 through a sixth diode D6. Such that current can only flow into the EN pin of the LDO chip 360.

Preferably, the EN pin of the LDO chip is connected to the COM communication pin of the control unit 330 through a fourth diode D4, such that the control unit 330 can wake up the LDO chip 360. The EN pin of the LDO chip 360 is also connected to a KEY through a fifth diode D5 to facilitate the user to directly wake up the LDO chip 360 through the KEY Referring to FIG. 4, after the control unit 330 does not work and any analog front-end chip 310 is awakened by an external interference signal, the 3V3 pin of the analog front-end chip 310 sends a signal to the coupled wake-up circuit 350 to wake up the LDO chip 360. Then, the LDO chip 360 supplies power to the control unit 330 to enable the control unit 330 to operate normally. The control unit 330 then detects whether there is a peripheral connected with the battery 70. If not, the control unit 330 sends a power-down signal to the analog front-end chip 310 to power the analog front-end chip 310 down.

Figure 6:
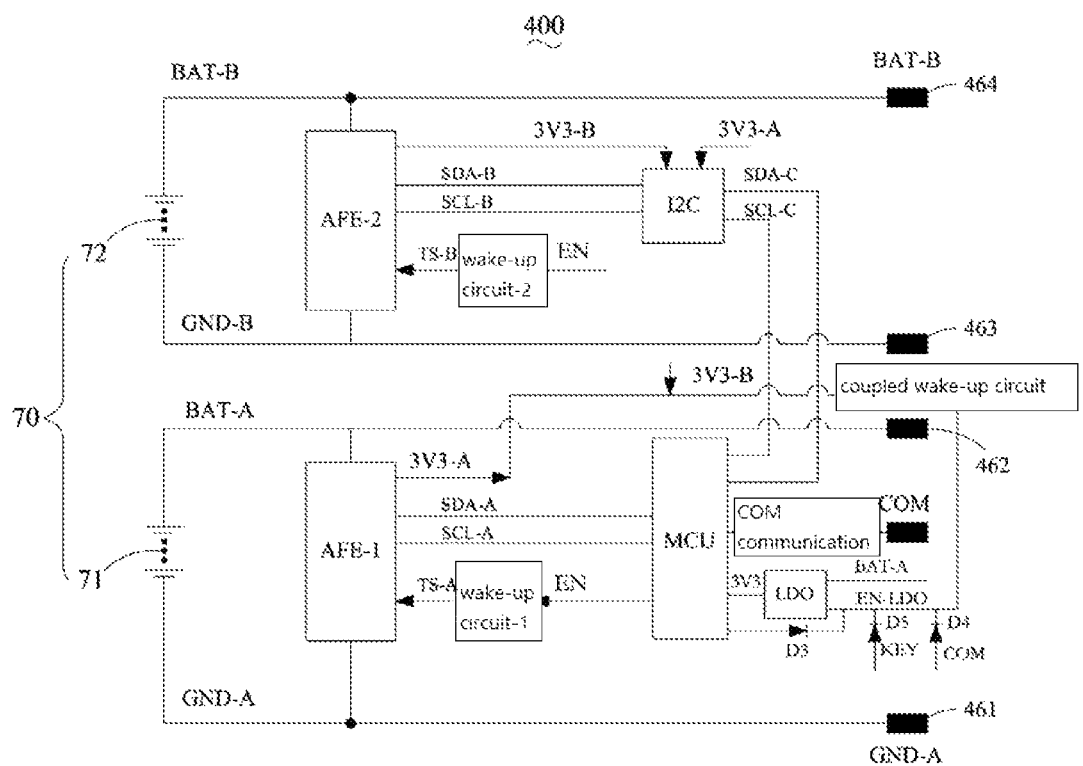
FIG. 6 is a block diagram of a battery management system in a fourth embodiment of the disclosure.

In the present embodiment, the first battery 71 and the second battery 72 are arranged directly in series to output a series voltage only. In other embodiments, however, the first battery 71 and the second battery 72 may also be configured to output a parallel voltage. FIG. 6 shows a battery management system 400 of a fourth embodiment of the disclosure, the structure of the battery management system 400 is substantially the same as the battery management system 300, except that the first battery 71 and the second battery 72 are independent of each other. The first battery 71 outputs power through the first terminal 461 and the second terminal 462, and the second battery 72 outputs power through the third terminal 463 and the fourth terminal 464. As such, the user may be facilitated to cooperate with the first terminal 461, the second terminal 462, the third terminal 463, and the fourth terminal 464 through different docking terminals to enable the battery 70 to output a series voltage or a parallel voltage.

The disclosure also provides a battery pack which includes a battery 70 and the battery management system 100, 200, 300, or 400 which monitors the battery 70.

The above embodiments is only used to illustrate the technical proposal of the disclosure, but not limited thereto. Although the disclosure has been described in detail with reference to preferable embodiments, it will be understood by those skilled in the field, and can be modified or replaced with equivalents without departing from the spirit and scope of the technical solutions of the disclosure.

What is claimed is:

1. A battery management system, comprising:
    at least two analog front-end chips, used for acquiring an output voltage, an output current, or a working temperature of a battery; and
    a control unit, controlling the analog front-end chip to be powered on or down;
    wherein the analog front-end chip directly or indirectly supplies power to the control unit to enable the control unit to work when any one of the analog front-end chips is awakened by an external interference signal, then the control unit sends a power-down signal to the analog front-end chip to power down the analog front-end chip.

2. The battery management system of claim 1, wherein the at least two analog front-end chips comprise a primary analog front-end chip and at least one advanced analog front-end chip;
    the advanced analog front-end chip directly or indirectly sends a wake-up signal to the primary analog front-end chip to wake up the primary analog front-end chip when the advanced analog front-end chip is awakened by an external interference signal, then the primary analog front-end chip supplies power to the control unit to enable the control unit to work; then, the control unit sends a power-down signal to the primary analog front-end chip and the advanced analog front-end chip to power down the primary analog front-end chip and the advanced analog front-end chip.

3. The battery management system of claim 2, wherein the control unit comprises a communication pin, and the analog front-end chip comprises a TS pin connected with the communication pin; wherein the control unit sends a wake-up signal to the TS pin through the communication pin to wake up the analog front-end chip.

4. The battery management system of claim 2, comprising a coupled wake-up circuit, wherein
the analog front-end chip comprises a 3V3 pin and a TS pin, and the control unit comprises a VCC pin; the 3V3 pin of the primary analog front-end chip is connected to the VCC pin of the control unit, and the 3V3 pin of the advanced analog front-end chip is connected to the TS pin of the primary analog front-end chip through the coupled wake-up circuit.

5. The battery management system of claim 4, wherein the analog front-end chip further comprises a GND pin, and the coupled wake-up circuit comprises a first resistor, a second resistor, a first capacitor and a second capacitor; wherein
two ends of the first resistor are connected to the 3V3 pin and the GND pin of the advanced analog front-end chip separately; two ends of the second resistor are connected to the TS pin and the GND pin of the primary analog front-end chip separately; two ends of the first capacitor are connected to the TS pin of the primary analog front-end chip and the 3V3 pin of the advanced analog front-end chip separately; and two ends of the second capacitor are connected to the GND pin of the primary analog front-end chip and the GND pin of the advanced analog front-end chip separately.

6. The battery management system of claim 4, further comprising
an LDO chip, supplying power to the control unit; wherein
the analog front-end chip sends a wake-up signal to the LDO chip to enable the LDO chip to supply power to the control unit to enable the control unit to work when any one of the analog front-end chips is awakened by an external interference signal; then the control unit sends a power-down signal to the analog front-end chip to power the analog front-end chip down.

7. The battery management system of claim 6, wherein the control unit comprises a communication pin and an EN pin, and the LDO chip comprises an EN pin, wherein
the communication pin is connected to the EN pin of the LDO chip, and the EN pin of the control unit is connected to a TS pin of the analog front-end chip.

8. The battery management system of claim 6, wherein the 3V3 pin of the analog front-end chip is connected to the EN pin of the LDO chip through the coupled wake-up circuit.

9. The battery management system of claim 8, wherein the analog front-end chip further comprises a GND pin; and
the coupled wake-up circuit comprises a third resistor, a fourth resistor, a third capacitor, and a fourth capacitor; wherein
two ends of the third resistor are separately connected to the 3V3 pin and the GND pin of one analog front-end chip; two ends of the fourth resistor are separately connected to the EN pin of the LDO chip and the GND pin of the other analog front-end chip; one end of the third capacitor is connected to one end of the third resistor close to the 3V3 pin, and the other end of the third capacitor is connected to the EN pin of the LDO chip; one end of the fourth capacitor is connected to one end of the third resistor close to the GND pin, and the other end of the fourth capacitor is connected to the GND pin of the LDO chip; and the 3V3 pins of the remaining analog front-end chips are connected to the EN pin of the LDO chip.

10. The battery management system of claim 9, wherein diodes are further arranged between the 3V3 pins of the remaining analog front-end chips and the EN pin of the LDO chip, such that current only flow into the EN pin of the LDO chip.

11. The battery management system of claim 1, wherein before the control unit sends a power-down signal, the control unit detects whether there is a peripheral connected to the battery; and if not, the control unit sends a power-down signal to the analog front-end chip to power the analog front-end chip down.

12. The battery management system according to claim 11, wherein
if a peripheral is connected to the battery, the control unit waits for a preset time and then sends the power-down signal to the analog front-end chip.

13. A battery pack, comprising:
a number of batteries;
a battery management system for controlling the number of batteries; wherein the battery management system comprises at least two analog front-end chips for acquiring an output voltage, an output current, or a working temperature of a battery; and
a control unit, controlling the analog front-end chip to be powered on or down;
wherein the analog front-end chip directly or indirectly supplies power to the control unit to enable the control unit to work when any one of the analog front-end chips is awakened by an external interference signal, then the control unit sends a power-down signal to the analog front-end chip to power down the analog front-end chip.

* * * * *